(12) United States Patent
Ando et al.

(10) Patent No.: US 9,339,793 B2
(45) Date of Patent: May 17, 2016

(54) CATALYST COMPOSITION FOR EXHAUST GAS CLEANING AND CATALYST FOR AUTOMOBILE EXHAUST GAS CLEANING (71) Applicant: N.E. CHEMCAT CORPORATION, Tokyo (JP)

(72) Inventors: Ryuji Ando, Shizuoka (JP); Takashi Yamada, Shizuoka (JP); Hiroyuki Hara, Shizuoka (JP)

(73) Assignee: N.E. CHEMCAT CORPORATION, Tokyo (JP)

( * ) Notice: Subject to any disclaimer, the term of this patent is extended or adjusted under 35 U.S.C. 154(b) by 0 days.

(21) Appl. No.: 14/379,819

(22) PCT Filed: Jan. 8, 2013

(86) PCT No.: PCT/JP2013/050081
§ 371 (c)(1),
(2) Date: Aug. 20, 2014

(87) PCT Pub. No.: WO2013/136821
PCT Pub. Date: Sep. 19, 2013

(65) Prior Publication Data
US 2015/0038325 A1    Feb. 5, 2015

(30) Foreign Application Priority Data

Mar. 14, 2012 (JP) ................. 2012-057202

(51) Int. Cl.
*B01J 23/00* (2006.01)
*B01J 23/02* (2006.01)
*B01J 23/08* (2006.01)
*B01J 23/10* (2006.01)
(Continued)

(52) U.S. Cl.
CPC ............. *B01J 23/63* (2013.01); *B01D 53/945* (2013.01); *B01J 23/10* (2013.01); *B01J 35/002* (2013.01);
(Continued)

(58) Field of Classification Search
CPC ............ B01J 23/00; B01J 23/02; B01J 23/10; B01J 23/38–23/46; B01J 23/54; B01J 23/58; B01J 23/63; B01J 21/04; B01J 21/066
USPC ......... 502/302–304, 327, 332–334, 339, 349, 502/355, 439, 527.12, 527.13
See application file for complete search history.

(56) References Cited

U.S. PATENT DOCUMENTS 4,843,056 A * 6/1989 Matsumoto .......... B01D 53/945
  502/302
5,057,483 A * 10/1991 Wan .................... B01D 53/945
  423/213.5

(Continued)

FOREIGN PATENT DOCUMENTS

JP    61-38626 A    2/1986
JP    64-4250 A     1/1989
(Continued)

OTHER PUBLICATIONS

International Search Report dated Mar. 19, 2013, issued in corresponding application No. PCT/JP2013/050081.

*Primary Examiner* — Cam N. Nguyen
(74) *Attorney, Agent, or Firm* — Westerman, Hattori, Daniels & Adrian, LLP (57) ABSTRACT

An exhaust gas purification catalyst composition and a catalyst for exhaust gas purification for automobile, superior in purification performance of a carbon monoxide (CO), a hydrocarbon (HC) and nitrogen oxides (NOx) in exhaust gas discharged from an internal combustion engine of a gasoline vehicle or the like. The exhaust gas purification catalyst composition for purifying a carbon monoxide (CO), a hydrocarbon (HC) and nitrogen oxides (NOx) in automobile exhaust gas, includes a catalyst composition where a rhodium particle (A) is supported on alumina (C) together with a neodymium oxide particle (B), or the like. The neodymium oxide particle (B) having an average particle diameter of 100 nm or smaller, exists at the neighborhood of the rhodium particle (A), as a transfer inhibiting material.

17 Claims, 4 Drawing Sheets (51) Int. Cl.
    *B01J 23/40*     (2006.01)
    *B01J 23/42*     (2006.01)
    *B01J 23/44*     (2006.01)
    *B01J 23/56*     (2006.01)
    *B01J 21/04*     (2006.01)
    *B01J 23/63*     (2006.01)
    *B01D 53/94*     (2006.01)
    *B01J 35/00*     (2006.01)
    *B01J 35/04*     (2006.01)
    *F01N 3/10*     (2006.01)

(52) U.S. Cl.
    CPC ............... B01J 35/006 (2013.01); B01J 35/04 (2013.01); *B01D 2255/1021* (2013.01); *B01D 2255/1023* (2013.01); *B01D 2255/1025* (2013.01); *B01D 2255/2065* (2013.01); *B01D 2255/2068* (2013.01); *B01D 2255/2092* (2013.01); *B01D 2255/9202* (2013.01); *F01N 3/101* (2013.01); *Y02T 10/22* (2013.01)

(56) References Cited

U.S. PATENT DOCUMENTS

| | | | | |
|---|---|---|---|---|
| 5,130,109 A | * | 7/1992 | Wan | B01D 53/945 423/213.2 |
| 5,254,519 A | * | 10/1993 | Wan | B01D 53/945 423/213.5 |
| 5,490,977 A | * | 2/1996 | Wan | B01D 53/945 423/210 |
| 7,759,279 B2 | * | 7/2010 | Shiratori | B01D 53/945 502/303 |
| 8,999,886 B2 | * | 4/2015 | Takeshima | B01D 53/945 502/302 |
| 2011/0111952 A1 | | 5/2011 | Shiratori et al. | |
| 2011/0152072 A1 | | 6/2011 | Miura | |

FOREIGN PATENT DOCUMENTS

| | | |
|---|---|---|
| JP | 3-106446 A | 5/1991 |
| JP | 5-237390 A | 9/1993 |
| JP | 6-75675 B2 | 9/1994 |
| JP | 9-215922 A | 8/1997 |
| JP | 2002-326033 A | 11/2002 |
| JP | 2006-326554 A | 12/2006 |
| JP | 2007-319768 A | 12/2007 |
| JP | 2008-289971 A | 12/2008 |
| JP | 2011-136319 A | 7/2011 |
| JP | 2011-200817 A | 10/2011 |
| WO | 00/27508 A1 | 5/2000 |
| WO | 2010/007839 A1 | 1/2010 |

\* cited by examiner

CATALYST COMPOSITION FOR EXHAUST GAS CLEANING AND CATALYST FOR AUTOMOBILE EXHAUST GAS CLEANING

TECHNICAL FIELD

The present invention relates to a catalyst composition for an exhaust gas purification and an catalyst for exhaust gas purification for automobile, and in more detail, the present invention relates to a catalyst composition for an exhaust gas purification and an catalyst for exhaust gas purification for automobile superior in purification performance of carbon monoxide (CO), hydrocarbons (HC) and nitrogen oxides ($NO_x$) in exhaust gas discharged from, in particular, a gasoline vehicle, and suitable as a three way catalyst (TWC).

BACKGROUND ART

In a catalyst apparatus for purifying exhaust gas discharged from an internal combustion engine of an automobile or the like, various catalysts have been used in response to object thereof. As a major catalyst component thereof, there is platinum group metals, and usually, it is used by being supported, in high dispersion, onto a refractory inorganic oxide having high surface area of activated alumina or the like (refer to PATENT LITERATURE 1).

As the platinum group metals as the catalyst component, platinum (Pt), palladium (Pd), and rhodium (Rh) have been known, which have been used widely as the catalyst for purification of exhaust gas discharged from an internal combustion engine of an automobile or the like. In the aforementioned TWC, a catalyst activated specie superior in oxidation activity, of Pt, Pd or the like, and Rh superior in purification activity of $NO_x$ are used in combination, in many cases. In recent years, regulations on hazardous substances contained in exhaust gas, in particular, $NO_x$, have become more and more severe. Accordingly, it is necessary to effectively use Rh superior in purification activity of $NO_x$. In addition, Rh is scarce in output and high price, which has caused price hike in recent market. Therefore, it is preferable to decrease used amount of Rh, as a catalyst activated specie, in view of resource protection as well as cost.

In addition, as for the exhaust gas purification catalyst, to attain enhancement of further purification performance, the addition of various promoter components, in addition to platinum group metals, to the catalyst has been investigated. As these promoter components, an Oxygen Storage Component (OSC), or an alkaline earth metal, or zirconium oxide, zeolite and the like have been known.

Among these, OSC is the one which stores and discharges oxygen in exhaust gas, and cerium oxide has been known. Cerium oxide stores oxygen as $CeO_2$, when oxygen concentration is high in exhaust gas, and discharges oxygen by being converted to $Ce_2O_3$, when oxygen concentration is low. Oxygen discharged is activated oxygen, which promotes purification of HC and CO, by being utilized in oxidation action by Pt or Pd. In addition, OSC also acts to buffer oxygen concentration change in exhaust gas, by storage and discharge of oxygen. By this action, purification performance of exhaust gas is enhanced in TWC. TWC is the one which performs oxidation and reduction by one catalyst, and has a range of exhaust gas components suitable for purification in view of designing. This range depends on air; fuel ratio in many cases. Such a range is called a window, and in many cases, exhaust gas combusted at the neighborhood of theoretical air-fuel ratio, called Stoichiometry, is set as the window region. Because change in oxygen concentration in exhaust gas is being buffered, this window region can be maintained for a long period of time, and purification of exhaust gas can be performed effectively. This is said to influence particularly on purification characteristics of $NO_x$ by Rh.

As such a cerium oxide, a pure cerium oxide can also be used, however, it is often used as a composite oxide with zirconium (refer to PATENT LITERATURE 2). A cerium-zirconium composite oxide is said to have high heat resistance and high storage and discharge rate of oxygen. The reason is considered that a crystal structure of the cerium-zirconium composite oxide is stable, and does not inhibit the action of a cerium oxide, which is a main OSC component, thus functions as the OSC up to inside of the particle.

On the other hand, in purification of $NO_x$ by Rh, it is considered that, for example, a steam reforming reaction or a CO+NO reaction is promoted via the Rh component as shown below and to purify $NO_x$.

(1)

(2)

(3)

And, it has become known technology that the zirconium oxide promotes the steam reforming reaction or the CO+NO reaction, when used together with the Rh component (refer to PATENT LITERATURE 3).

In addition to a purification reaction of $NO_x$ by HC, shown below, such reactions are generated, and thus, purification of $NO_x$ is further accelerated, therefore, presence of a promoter for accelerating the steam reforming reaction, other than the zirconium oxide, is very important.

(4)

As the promoter component, in addition to this, an alkaline earth metal such as the Ba component has also been known (refer to PATENT LITERATURE 4). The Ba component temporarily stores $NO_x$ contained in exhaust gas, and purifies the stored $NO_x$ by reducing to $N_2$ by a reducing component contained in exhaust gas.

In general, $NO_x$ is generated in a large quantity, when fuel supplied to an engine is less, or amount of air is more, or combustion temperature is high. The Ba component temporarily absorbs $NO_x$ generated in this way.

And, $NO_x$ absorbed into the Ba component is discharged from the Ba component, when $NO_x$ concentration in exhaust gas becomes low, and CO concentration in exhaust gas becomes high. In continuing the aforementioned example, this is caused by reaction of $Ba(NO_3)_2$ with CO to be converted to $BaCO_3$, and can be said chemical equilibrium. $NO_x$ discharged from the Ba component, as described above, is purified by reduction, by a reaction with a reducing component at the Rh component surface.

Such a promoter component may be used in combination of two or more and, for example, TWC has been known where the Ba component and cerium oxide are used (refer to PATENT LITERATURE 5). However, it has been reported that purification performance may be decreased depending on combination of catalyst materials and, for example, presence of the Rh component and the Ba component in the same composition decreases purification performance of $NO_x$ (refer to PATENT LITERATURE 6). The reason for this is considered that, because the alkaline earth metal component has action of storing $NO_x$, purification action of $NO_x$ in the Rh component is interfered, or an oxidized Rh structure is stabilized by electron donating action from Ba to Rh.

Therefore, it has been proposed to enhance purification performance of $NO_x$ and heat resistance, by supporting the Rh component and the Ba component onto alumina in a separated state (refer to PATENT LITERATURE 7). In this LITERATURE, there is no description on what degree the Rh component and the Ba component are separated in the catalyst layer, however, in the case of using water-soluble Ba acetate as a Ba source, the Ba component elutes into slurry, and thus it cannot be said that it is sufficiently separated from the Rh component. As a result, the Rh component and the Ba component come close and thus a problem of decrease in purification performance of $NO_x$ cannot be solved sufficiently.

In addition, there have been challenged a method for adding a rare earth oxide, such as neodymium oxide, praseodymium oxide, to alumina, in order to enhance heat resistance of alumina, which is a base material, or $CeO_2$, which is an OSC component (refer to PATENT LITERATURE 8), or adding a rare earth oxide such as lanthanum oxide, neodymium oxide, to a cerium oxide (refer to PATENT LITERATURE 9), as well as supporting Rh, Pd or the like, which is a noble metal, onto both of alumina particles having heat resistance enhanced by lanthanum oxide, zirconia or the like, and $CeO_2$ fine particles having heat resistance enhanced by neodymium oxide, zirconia or the like (refer to PATENT LITERATURE 10).

In this way, there are various combinations of the catalyst components, and complicated reaction routes are taken by interaction of the catalyst components, and thus by overall investigation on these, a combination of the catalyst components which exerts purification action most has been searched.

By the way, the exhaust gas purification catalyst may be arranged as one set in exhaust gas passage, however, there may be the case where two or more are arranged. This aims at more utilization of characteristics of the exhaust gas purification catalyst, in association with strengthening of exhaust gas regulations, and each optimum position is required to be set, in response to durability (heat resistance, atmosphere resistance, poisoning resistance), catalyst characteristics (oxidation activity, reduction activity) or the like which each noble metal of platinum, palladium and rhodium has.

In addition, to reduce used amount of high-priced noble metals or rare earth metals leads to efficient utilization of a limited resource, and also in view of this, it has been required to set the exhaust gas purification catalyst at the optimum position of exhaust gas passage, in response to respective characteristics of the noble metals or the rare earth metals.

Still more, regulations on exhaust gas has become severer and severer in recent years, and advent of such a catalyst has been desired that exerts more superior exhaust gas purification performance, by using multiple catalysts. Among exhaust gas, regulation value for, in particular, $NO_x$ has become severer, which cannot be attained by the above conventional catalysts, and thus also in TWC, needs of the catalyst for exhaust gas purification superior in purification performance of $NO_x$ has increased.

CITATION LIST

Patent Literature

PATENT LITERATURE 1: JP-A-05-237390
PATENT LITERATURE 2: JP-B-06-75675
PATENT LITERATURE 3: JP-A-2000/027508
PATENT LITERATURE 4: JP-A-2007-319768
PATENT LITERATURE 5: JP-A-03-106446
PATENT LITERATURE 6: JP-A-2002-326033
PATENT LITERATURE 7: JP-A-09-215922
PATENT LITERATURE 8: JP-A-61-38626
PATENT LITERATURE 9: JP-A-64-4250
PATENT LITERATURE 10: JP-A-2011-200817

SUMMARY OF INVENTION

Technical Problem

In view of the above conventional problems, it is an object of the present invention to provide the catalyst for purifying harmful substances (CO, HC, $NO_x$) contained in exhaust gas discharged from an internal combustion engine of an automobile or the like, in particular, an catalyst composition for exhaust gas purification and an catalyst for exhaust gas purification for automobile suitable as TWC catalyst.

Solution to Problem

The present inventors have intensively studied a way to solve the above conventional problems and found that by setting a honeycomb structure-type catalyst, which is coated with a catalyst composition including a catalyst component supported in a specific state, in a passage of exhaust gas discharged from an internal combustion engine of a gasoline vehicle or the like, to configure an exhaust gas purification catalyst apparatus for automobile for purifying carbon monoxide (CO), hydrocarbon (HC) and nitrogen oxides ($NO_x$), and when exhaust gas is passed on this, decrease in purification of CO, HC, NOx can be inhibited, by presence of rhodium (Rh) particles supported on alumina together with the neodymium oxide ($Nd_2O_3$) particle supported at the neighborhood thereof, because transfer of the Rh particles is physically inhibited, transfer of the Rh particles is inhibited by interaction between the Rh particles and the neodymium oxide particle, and Rh particle growth is inhibited, even in exposure to high temperature exhaust gas for a long period of time, and thus have accomplished the present invention.

That is, according to a first aspect, there is provided an exhaust gas purification catalyst composition for purifying a carbon monoxide (CO), a hydrocarbon (HC) and nitrogen oxides ($NO_x$) in exhaust gas, containing a catalyst composition where a rhodium (Rh) particle (A) is supported on alumina (C), together with a neodymium oxide ($Nd_2O_3$) particle (B), characterized in that the neodymium oxide particle (B), having an average particle diameter of 100 nm or smaller, exists at the neighborhood of the rhodium particle (A), as a transfer inhibiting material.

In addition, according to a second aspect of the present invention, in the first aspect, there is provided the exhaust gas purification catalyst composition, characterized in that supported amount of neodymium oxide is 1 to 20% by weight.

In addition, according to a third aspect of the present invention, in any of the first or the second aspect, there is provided the catalyst for exhaust gas purification for automobile according to claim 1 or 2, characterized in that a material including alumina, on which the rhodium particle (A) and the neodymium oxide particle (B) are supported, is coated on an integral structure-type carrier, as a catalyst layer.

In addition, according to a fourth aspect of the present invention, in any of the first to the third aspects, there is provided the exhaust gas purification catalyst composition, characterized in that an average particle diameter of the rhodium particle (A) is 100 nm or smaller.

In addition, according to a fifth aspect of the present invention, in the fourth aspect, there is provided the catalyst for exhaust gas purification for automobile, characterized in that the catalyst layer further includes a ceria-zirconia composite oxide.

In addition, according to a sixth aspect of the present invention, in the fourth or fifth aspect, there is provided the catalyst for exhaust gas purification for automobile, characterized by being coated with a catalyst layer including a noble metal different from rhodium, other than the aforesaid catalyst layer.

In addition, according to a seventh aspect of the present invention, in any of the fourth to the sixth aspects, there is provided the exhaust gas purification catalyst for automobile, characterized in that the noble metal different from rhodium is platinum and/or palladium.

Further, according to an eighth aspect of the present invention, in any of the fourth to the seventh aspects, there is provided the exhaust gas purification catalyst for automobile, characterized in that total coated amount of the catalyst composition is 50 to 300 g/L per unit volume of the integral structure-type carrier.

Advantageous Effects of Invention

The catalyst composition for exhaust gas purification of the present invention is superior in purification activity of hydrocarbon, carbon monoxide and nitrogen oxides, and exerts high purification performance to CO, HC and $NO_x$ discharged from an internal combustion engine of gasoline engine or the like.

Further, because the catalyst for exhaust gas purification for automobile of the present invention is superior in durability, used amount of a high-priced active noble metal can be saved, which can produce at low cost, and can produce stably and supply an exhaust gas purification apparatus.

DESCRIPTION OF EMBODIMENTS

Hereinafter, explanation will be given in more detail on the catalyst composition for exhaust gas purification, including a catalyst composition where a rhodium particle of the present invention is supported on alumina together with a neodymium oxide particle. It should be noted that description will be made mainly on an embodiment in a gasoline engine, however, the present invention is not limited to automotive applications, and it is applicable widely to denitration technology of nitrogen oxides in exhaust gas.

1. Catalyst Composition for Exhaust Gas Purification

The catalyst composition for exhaust gas purification of the present invention (hereafter it may be referred to as a catalyst composition simply) is the one, where rhodium (Rh) and neodymium oxide ($Nd_2O_3$) are supported on alumina, and neodymium oxide exists as a particle, having an average particle diameter of 100 nm or smaller, so as to surround the rhodium particle having an average particle diameter of 100 nm or smaller.

(1) Alumina

In the present invention, alumina is one kind of the porous inorganic oxide, and functions as a base material for supporting Rh, which is a noble metal, in a highly dispersed state. In addition to γ-alumina, there is included β-alumina, δ-alumina, θ-alumina, or the like, and alumina having a large BET specific surface area is preferable. α-Alumina, because of having a small BET specific surface area of 10 $m^3$/g or less, is not preferable as a base material for supporting Rh in a highly dispersed state. However, BET specific surface area of 300 $m^2$/g or more is not preferable, because pore size inside the particle is too small, and gas diffusion inside the pore becomes late. BET specific surface area of alumina is preferably 20 to 250 $m^2$/g, more preferably 80 to 250 $m^2$/g, and still more preferably 100 to 200 $m^2$/g.

In addition, average particle diameter of alumina is preferably 50 μm or smaller, and more preferably 40 μm or smaller. When the average particle diameter of alumina is over 50 μm, gas diffusion to the center part of the particles becomes late, and the center part of the alumina particles cannot be utilized effectively, and thus it is not preferable.

(2) Rhodium (Rh)

In the present invention, rhodium of a noble metal element functions as active metal. Rhodium is supported on the above alumina, and as a starting salt to be used in that occasion, rhodium nitrate, rhodium chloride, rhodium acetate, rhodium sulfate, or the like are preferable. In particular, use of rhodium nitrate or rhodium acetate is preferable, where residue of chlorine or sulfide or the like does not remain after calcining.

Average particle diameter of the rhodium particles is preferably 100 nm or smaller. The average particle diameter is more preferably 80 nm or smaller, and still more preferably 50 nm or smaller. The average particle diameter of the rhodium particles over 100 μm may deteriorate dispersibility, and also decrease catalyst performance, in some cases.

Supported amount of rhodium onto alumina is not especially limited, however, it is preferably from 0.05 g/L to 2.0% by weight, and more preferably from 0.1 to 1.0% by weight. The amount of rhodium less than 0.05% by weight decreases abruptly denitration performance, while the amount over 2.0% by weight is not preferable in view of cost, although there is no problem in view of denitration performance.

(3) Neodymium Oxide

In the present invention, neodymium oxide is a kind of a rare earth oxide, and functions as a transfer inhibiting material to inhibit particle growth of Rh, which is a noble metal. Particle diameter of neodymium oxide is preferably about the same as that of the Rh particle, and is capable of providing high dispersion. The particle diameter of neodymium oxide excessively larger than that of the Rh particle does not provide high dispersion, which makes difficult for neodymium oxide to exist at the neighborhood of the Rh particle, and may not function as the transfer inhibiting material in some cases. On the contrary, the particle diameter of neodymium oxide excessively smaller than that of the Rh particle cannot physically inhibit transfer of the Rh particle, excessively increase interaction between the Ph particle and the neodymium oxide particle, and may increase a rhodium oxide having low activity.

Accordingly, as a starting salt, liquid-like or sol-like one is preferable. As the liquid-like one, neodymium nitrate, neodymium acetate, neodymium carbonate, neodymium chloride, neodymium sulfate, or the like is preferable. In particular, use of neodymium nitrate, neodymium acetate and neodymium carbonate is preferable, which does not leave residue of chlorine or sulfide or the like after calcining. In addition, as a sol-like substance, neodymium oxide sol is preferable.

In addition, it is preferable that in the present invention, the neodymium oxide particle is highly dispersed at the neighborhood of the Rh particle, because neodymium oxide is superior in capability of promoting the steam reforming reaction of Rh, as compared with other metal oxide, as will be described later. The role of neodymium oxide for promoting the steam reforming reaction of Rh is not clear, however, there is a possibility that it is superior in adsorption amount or adsorption rate of steam, as compared with other metal oxides.

Particle diameter of neodymium oxide is preferably 100 nm or smaller, more preferably 80 nm or smaller, and still more preferably 50 nm or smaller. The particle diameter over 100 nm is not preferable in view of dispersion property as a transfer inhibiting material. It should be noted that molecular size of one neodymium oxide molecule is about 1 nm, and the neodymium oxide particle is formed by assembling of several to several tens of neodymium molecules.

Figure 6:
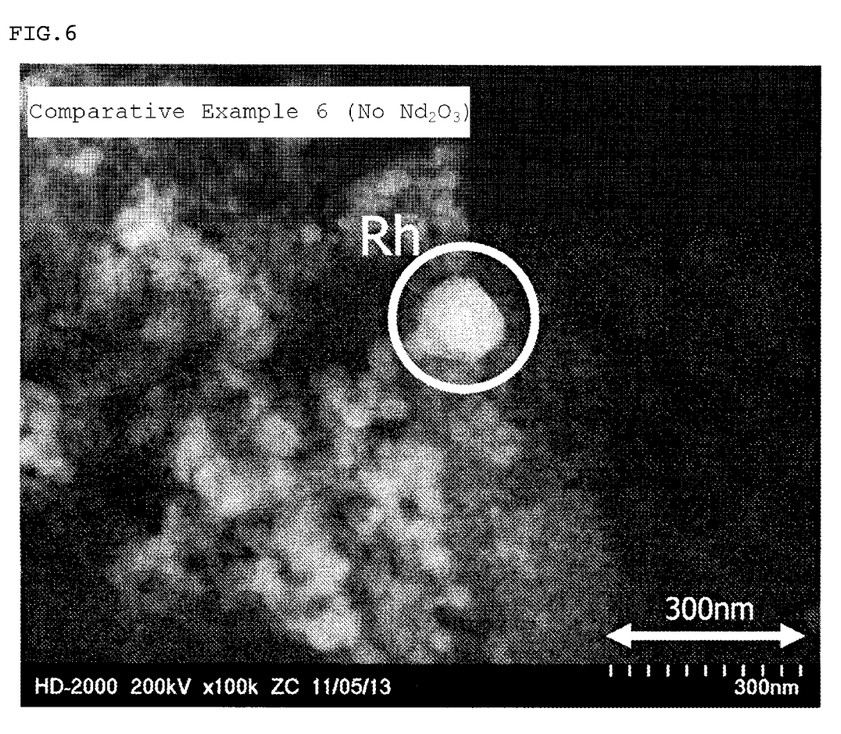
FIG. 6 is a transmission electron microscope photograph, showing measurement result of the Rh particles, in the catalyst for exhaust gas purification for automobile of Comparative Example 6.

Supported amount of neodymium oxide onto alumina is not especially limited, but it is preferably 0.5 to 20% by weight, more preferably 1 to 10% by weight, and particularly preferably 2 to 5% by weight. The amount of neodymium oxide less than 0.5% by weight, as shown in FIG. 6, provides inferior effect of blocking the Rh particles, while the amount more than 20% by weight might cover the Rh particles, and also is not preferable also in view of price.

Figure 5:
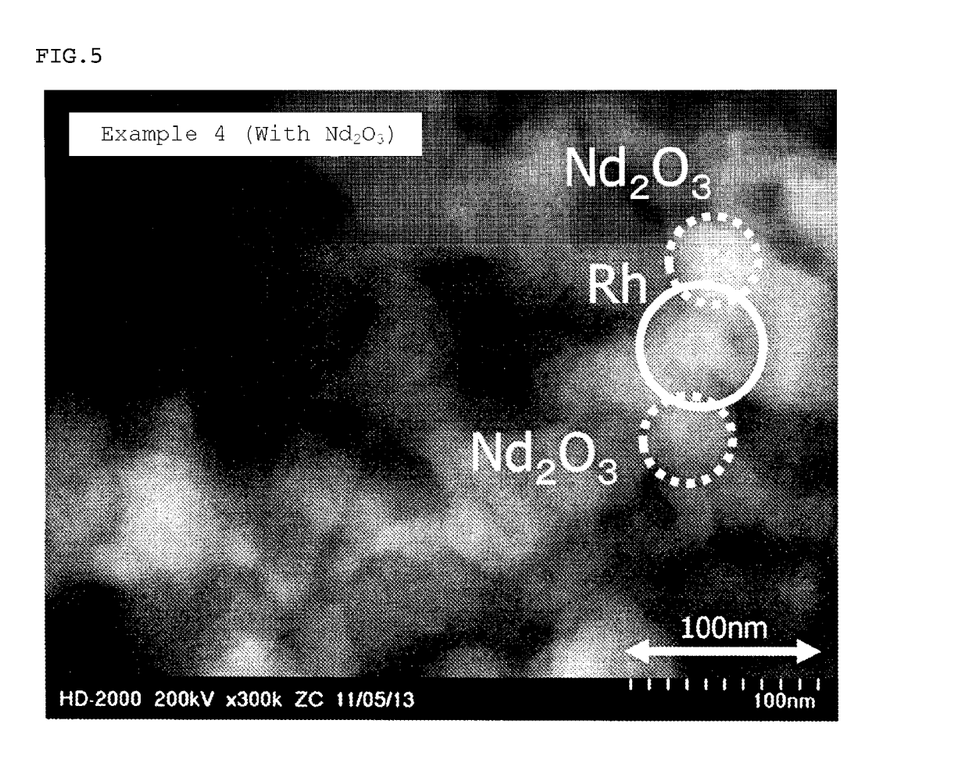
FIG. 5 is a transmission electron microscope photograph showing the relation of Rh particles and $Nd_2O_3$ particles, in the catalyst for exhaust gas purification for automobile of Example 4.

In this way, by setting the particle diameter of neodymium oxide to 100 nm or smaller, supported amount of neodymium oxide onto alumina to 0.5 to 20% by weight, and particle diameter of rhodium within a specific range, it becomes possible for the particle of neodymium oxide to locate at the neighborhood of the particle of rhodium so as to surround the particle of rhodium, as shown in FIG. 5.

The catalyst composition for exhaust gas purification of the present invention can be used as a structure-type catalyst where the above catalyst components are coated onto various kinds of carrier surfaces. Here, shape of the carrier is not especially limited, and can be selected from a structure-type carrier of such as prism, cylinder, sphere, honeycomb and sheet-type or the like. The size of the structure-type carrier is not especially limited, and the one having, for example, a diameter (length) of from several millimeters to several centimeters can be used, as long as it is any of the prism, cylinder and sphere-type one.

2. Catalyst for Exhaust Gas Purification for Automobile

The catalyst for exhaust gas purification for automobile of the present invention (hereafter, it may also be referred to a catalyst simply) is the one where a material including alumina, on which rhodium and neodymium oxide are supported, covers a honeycomb-structure carrier in one or more layers. The layer configuration may be a single layer, however, in the case where exhaust gas regulation is severe, it is preferable to adopt two or more layers.

In addition, one or more kinds of noble metals such as palladium or platinum can be added, in addition to rhodium, and in this case, said noble metal may be present in the same layer together with rhodium, or it may be present in a different layer. Still more, a barium compound or a binder can also be added, and in this case, it is preferable that the barium compound exists in a different layer from rhodium, or in the case of presence in the same layer, it is preferable that both do not contact directly, by supporting rhodium and the barium compound onto different base materials.

(1) Alumina Supported by Rhodium and Neodymium Oxide

In the present invention, it is necessary to use alumina supported by rhodium (Rh) and neodymium oxide ($Nd_2O_3$), as described before. As quality of material of alumina, as described above, there is included γ-alumina, β-alumina, δ-alumina, θ-alumina, or the like, excluding α-alumina. Average particle diameter of the rhodium particle and neodymium oxide, and supported amount of those onto alumina or the like are as described above.

(2) Ceria-Zirconia Composite Oxide

In the present invention, the ceria-zirconia composite oxide has function as the OSC material and function as a base material. As the OSC material, ceria (a ceria oxide) is the main part, however, it is preferable to add a zirconia (zirconium oxide), to enhance heat resistance while maintaining OSC function. On the other hand, as the base material, the zirconia is the main part, however, it is preferable to add ceria, in order to promote oxidation-reduction action of a noble metal to be supported.

In the ceria-zirconia composite oxide, mixing ratio of ceria and zirconia is not especially limited, however, a ceria ratio of 10 to 80% by weight is preferably, and more preferably 20 to 70% by weight, to satisfy both function as the OSC material and function as the base material. The ceria ratio less than 10% by weight may provide a trouble in function as the OSC, while the ratio more than 80% by weight may pose a problem for function as the base material, in some cases.

The ceria-zirconia composite oxide may be added further with a rare earth oxide such as a lanthanum oxide, a praseodynium oxide or the like, to further increase heat resistance.

(3) Rhodium (Rh)

As described above, in the present invention, rhodium functions as a catalyst (active metal). Supported amount of rhodium onto alumina is preferably 0.05 g/L to 2.0 g/L, and more preferably 0.1 to 1.5 g/L. The amount of rhodium less than 0.05 g/L abruptly decreases denitration performance, while the amount more than 2.0 g/L is not preferable in view of price, although there is no problem in denitration performance.

In addition, particle diameter of the rhodium particle generally increases by heating in production and aging, however, it is preferably 100 nm or smaller, more preferably 80 nm or smaller, and still more preferably 50 nm or smaller. It should be noted that atomic size of one rhodium atom is about 0.3 nm, and the rhodium particle is formed by assembling of several to several tens of rhodium atoms.

In this way, by setting supported amount of rhodium onto alumina to 0.05 g/L to 2.0 g/L, and the particle diameter of rhodium to 100 nm or smaller, it becomes possible for the particle of rhodium to be positioned at the neighborhood of the particle of rhodium so as to be surrounded by particle of neodymium oxide.

(4) Palladium (Pd)

In the present invention, palladium of a noble metal element functions as active metal, similarly to rhodium.

Palladium can be supported on the ceria-zirconia composite oxide, and as a starting salt to be used in that occasion, palladium nitrate, palladium chloride, dinitro diammine palladium, or the like is preferable. In particular, use of palladium nitrate and dinitro diammine palladium is preferable, which does not leave residue of chlorine or sulfide or the like after calcining.

Supported amount of palladium onto the ceria-zirconia composite oxide is preferably 0.1 g/L, to 10.0 μg/L, and more preferably 0.5 to 6.0 g/L. The amount of palladium less than 0.1 g/L abruptly decreases purification performance of HC, CO or the like, while the amount more than 10.0 g/L is not preferable in view of price, although there is no problem in purification performance.

(5) Platinum (Pt)

In the present invention, as other active metal, platinum of a noble metal can also be used.

As a starting salt to be used in that occasion, hexachloroplatinic (Iv) acid, diamminedinitroplatinum(II) nitrate, an ethanolamine solution of hexahydroxoplatinic acid, tetrachloroplatinic (II) acid, platinum nitrate, or the like is preferable. In particular, use of diamminedinitroplatinum(II) nitrate, an ethanolamine solution of hexahydroxoplatinic acid, platinum nitrate or the like is preferable, which does not leave residue of chlorine or sulfide or the like after calcining.

Supported amount of platinum is preferably 0.05 g/L to 5.0 g/L, and more preferably 0.1 to 3.0 g/L. The amount of platinum less than 0.05 g/L abruptly decreases purification performance of HC, CO or the like, while the amount more than 5.0 g/L is not preferable in view of price, although there is no problem in purification performance.

(6) Barium Compound

In the present invention, barium has high electron donating property and has function to stabilize a noble metal by donating an electron via interaction with the noble metal.

A noble metal such as platinum, palladium, rhodium decreases melting point thereof when it becomes an oxide, and therefore has tendency to increase particle growth. Accordingly, by donating electrons to the noble metal by having barium existed at the neighborhood of the noble metal, and promoting transfer from an oxide, which is easily grown to a particle, to a metal, dispersion property of the noble metal can be maintained.

In addition, because barium is additionally capable of temporarily adsorbing $NO_x$ under high temperature and oxidative atmosphere, it is useful also as a promoter of $NO_x$ purification.

A form of the barium compound is not especially limited, and water-soluble barium acetate, barium hydroxide, barium oxide, barium chloride, or the like, as well as insoluble barium sulfate or barium carbonate, or the like can be used.

(7) Binder

In the present invention, a binder such as alumina sol or the like can be used for adhering to a base material particle or a promoter particle, to bind each particle.

Alumina sol is composed of fine particles of from several tens nm to several μm, and adheres and binds with the base material particle or the promoter particle. Amount of the binder is not especially limited, and even a small amount is not a problem in particular, as long as the catalyst does not peel off from the honeycomb structure even after aging.

As the binder, various kinds of sol such as silica sol, zirconia sol, titania sol can be included, in addition to alumina sol. In addition, a soluble salt such as aluminum nitrate, aluminum acetate, zirconium nitrate, zirconium acetate can also be used. In addition to these, acids such as acetic acid, nitric acid, hydrochloric acid, sulfuric acid e can also be used.

It is preferable that the catalyst for exhaust gas purification of the present invention is used as an integral structure-type catalyst where honeycomb-like carrier surface is coated with the above catalyst component. Size of the honeycomb-like integral structure-type carrier is not especially limited, and the one having a diameter (length) of, for example, from several millimeters to several centimeters can be used.

(8) Honeycomb Structured Carrier

The honeycomb structure carrier means such one as composed of ceramics such as cordierite, silicon carbide, silicon nitride, or a metal such as stainless steel, and the structure thereof has many parallel fine gas passage extending over the whole structure carrier, and thus may also be referred to as the integral structure-type carrier. As this material, cordierite is preferable in view of durability and cost.

In addition, number of holes at the opening part of the honeycomb structure carrier is determined in a proper range, in consideration of kind of exhaust gas to be processed, gas flow rate, pressure drop or removing efficiency or the like. Cell density thereof is preferably from 100 to 900 cells/inch$^2$ (15.5 to 139.5 cells/cm$^2$), and more preferably from 200 to 600 cells/inch$^2$ (31 to 93 cells/cm$^2$). The cell density over 900 cells/inch$^2$ (139.5 cells/cm$^2$) tends to generate clogging by adhered PM, while the cell density below 100 cells/inch$^2$ (15.5 cells/cm$^2$) makes geometrical surface area small, causing decrease in effective utilization rate of the catalyst. It should be noted that the cell density means cell number per unit surface area in cross-section, when the honeycomb structure carrier is cut perpendicular to a gas passage.

In addition, as the honeycomb structure carrier, there has been known a flow-through-type structure, where a gas passage is communicated, and a wall-flow-type structure, where a part of end face of the gas passage is closed, and gas is able to flow through the wall face of the gas passage. The flow-through-type structure provides less air resistance and smaller pressure drop of exhaust gas. In addition, the wall-flow-type structure is capable of filtering off particle-like components contained in exhaust gas. The catalyst for exhaust gas purification of the present invention can be used in either of the structures.

(9) Layer composition

The catalyst for exhaust gas purification for automobile of the present invention is the one where the above catalyst composition is coated onto the honeycomb structure carrier in one or more layers. Layer configuration may be one layer, however, it is preferable to enhance exhaust gas purification performance by providing two or more layers.

Specifically, the catalyst composition of the present invention inhibits transfer of rhodium on alumina surface under a high temperature state, and inhibits particle growth of the rhodium particle or transfer thereof to the base material, by supporting neodymium oxide onto an alumina base material. That is, according to the present invention, because rhodium on alumina is stably present on alumina at high temperature, in either of the case of being mixed with a base material on which other noble metal is supported in a single layer state, or the case of taking a multilayer structure with the base material on which other noble metal is supported in a two or more layers state, superior purification characteristics of CO, HC, $Na_x$ can be maintained.

Still more, presence of neodymium oxide around rhodium promotes the steam reforming reaction of rhodium, by which the purification reaction of CO, HC and $NO_x$ is further promoted.

In the present invention, under fundamental concept that rhodium and neodymium oxide are supported onto alumina, in this way, configuration of catalyst layer, arrangement of a noble metal to each layer, kind•amount and arrangement to each layer of the promoter (a compound containing rear earth, alkali metal, alkaline earth metal, transition metal), and the like are determined, in response to specification•displacement of an engine to be loaded on a vehicle, catalyst volume allowable inside the vehicle, used number of catalyst, kind•amount•ratio of allowable noble metal.

In the present invention, total coated amount of the catalyst composition is preferably from 50 to 300 g/L, and more preferably from 100 to 250 g/L. The amount less than 50 g/L deteriorates dispersion property of a noble metal such as Rh to be supported accompanied with decrease in amount of a base material, as well as decreases amount of the OSC material, which decreases purification performance of harmful substances (HC, CO, $NO_x$), and thus it is not preferable, while the amount more than 300 g/L narrows inside the cell, which increases pressure drop and load to an engine, and thus it is not preferable.

3. Preparation Method of Catalyst (1) Preparation Method of Catalyst Composition To prepare the catalyst composition for exhaust gas purification of the present invention, supporting of rhodium and neodymium oxide onto alumina can adopt, for example, the following methods.

(Process 1: Successive Supporting)

Specific amount of a rhodium salt and a neodymium-containing raw material, which are starting raw materials, are prepared for successive support without mixing. There is no limitation of property of an aqueous solution or a suspension solution, even it is acidic, neutral or alkaline, as long as the starting raw materials, both the rhodium salt and the neodymium-containing raw material, are water-soluble or suspensible. In addition, neodymium is preferably suspensible sol rather than a water-soluble raw material. There is no problem in supporting order, whether in the order of rhodium and then neodymium, or in the reversed order of neodymium and then rhodium. However, in the case of the order of rhodium and then neodymium, a part of rhodium could be coated with neodymium to be supported later, therefore the order of neodymium and then rhodium is preferable to effectively utilize expensive rhodium as well as possible.

(Process 2: Simultaneous Supporting)

Specific amount of the above-described water-soluble rhodium salt, and water-soluble or suspensible raw material containing neodymium, as starting raw materials, are each prepared for mixing and stirring to prepare an aqueous solution or a suspension solution. In this occasion, the case where properties (acidic.alkaline) of the aqueous solution of the rhodium salt, and the aqueous solution or suspension solution containing neodymium are different, could coagulate both components and generate a precipitate, therefore, property of the aqueous solution or suspension solution containing rhodium and neodymium is required to unify by acidic or alkaline, respectively.

It should be noted that the process 1 and 2 can be used properly, depending on amount of rhodium usable in the catalyst, production cost including raw material cost, purification performance required or the like, however, the process 2 is better because the distance between rhodium particle and neodymium oxide particle becomes easier to come close each other.

(2) Preparation Method for an Integral Structure-Type Catalyst

To prepare the catalyst for exhaust gas purification for automobile of the present invention, the above catalyst composition and a binder or the like, as needed, are mixed with an aqueous medium to make a slurry-like mixture, and then it is coated onto the integral structure-type carrier, and dried and calcined.

That is, firstly, the catalyst composition and the aqueous medium are mixed in a predetermined ratio to obtain the slurry-like mixture. In the present invention, the aqueous medium may be used in such an amount that is capable of dispersing the catalyst composition uniformly in the slurry.

In this occasion, blending of an acid or alkali for pH adjustment, or blending of a surfactant, a resin for dispersion or the like for viscosity adjustment or for enhancement of slurry dispersibility, as needed, is allowed. As a mixing method for slurry, pulverization mixing by a ball mill or the like is applicable, however, other pulverization or mixing methods may be applied.

Next, a slurry-like mixture is coated onto the integral structure-type carrier. The coating method is not especially limited, however, a washcoat method is preferable.

By performing drying and calcining after the coating, the integral structure-type catalyst, where the catalyst composition is supported, is obtained. It should be noted that drying temperature is preferably from 70 to 200° C., and more preferably 80 to 150° C. In addition, calcining temperature is preferably from 300 to 700° C., and more preferably 400 to 600° C. Heating means may be performed by known heating means such as an electric furnace or a gas furnace.

4. Catalyst Apparatus for Exhaust Gas Purification

In the present invention, the catalyst apparatus is configured by arranging the above catalyst for exhaust gas purification for automobile in an exhaustion system from an engine.

Position and number of the catalyst in the exhaust system from an engine may be designed, as appropriate, in response to exhaust gas regulations. In a vehicle whose exhaust gas regulation is not severe, it is possible to correspond by one catalyst apparatus, while in a vehicle whose exhaust gas regulation is severe, two catalysts are used which can be arranged at the under floor position at the later stage of the manifold catalyst in the exhaustion system.

In this occasion, layer configuration of the catalysts can be determined in response to discharge concentration of CO, HC and $NO_x$ and an operation system, and whether a single layer catalyst composed of an alumina material containing rhodium and neodymium oxide, and a single or multiple noble metals, or a multilayer catalyst composed of an alumina material containing rhodium and neodymium oxide, and a single or multiple noble metals can be used properly.

Still more, in the present invention, as will be described later, superior effect in all purification reactions of CO, HC and $NO_x$ can be exerted, not only in starting at low temperature but also in total driving specification including high speed driving at high temperature.

EXAMPLES

Examples and Comparative Examples of the present invention will be shown below, however, the present invention should not be construed as limited to these Examples. It should be noted that a catalyst activity test, engine aging•driving test, and measurement of Rh particle diameter and Rh oxidation state were performed by the following procedure.

(1) Activity Test of Catalyst

From each sample after calcining, obtained in the following Examples and Comparative Examples, 100 mg was weighed, which was put into a sample tube of a TPD-Type R, manufactured by Rigaku Co., Ltd. (TPD: Temperature Program Desorption). The sample was evaluated by an SR (Steam Reforming) reaction. As reaction gas condition, 300 mL/min in total, of gas composed of 1,250 ppm of $C_2H_6$, 5,000 ppm of $H_2O$, and He as balance, was used, whose temperature was raised from room temperature up to 600° C. in a rate of 30° C. % min, to measure HC consumed and $H_2$ gas generated in the SR reaction. Gas analysis was performed using a quadruple mass spectrometer.

(2) Engine Aging·Driving Test of Catalyst

After housing the catalysts, obtained in the following Examples and Comparative Examples, one by one, into a converter, the converter was loaded at the exhaust port of a 1.3 L-engine, catalyst bed temperature was controlled at 950° C., and the engine was operated for 50 hours to perform aging treatment. After that, by loading the converter with the catalyst after engine aging, at the exhaust port of a vehicle loaded with the 1.3 L-engine, a driving test was performed under a JC08C mode, on a chassis stand. Then, discharge amount of HC and $NO_x$ was measured in a cold region (region where exhaust gas temperature is from 300 to 500° C. in an initial acceleration-deceleration mode) and total driving mode. It should be noted that each discharge amount of CO, HC and $NO_x$ was calculated by discharge amount in each Example, as relative amount based on discharge amount in Comparative Example 6 as 100.

(3) Measurement of Particle Diameter of Rh and an Oxidation State of Rh

The particle diameter of Rh was measured using a TEM (Transmission Electron Microscope: HD2000, manufactured by Hitachi High-Tech Manufacturing & Service Corp.).

In addition, the oxidation state of Rh was measured using an XPS (X-ray Photoelectron Spectroscopy: Quantera SXM, manufactured by Ulvac-Phi, Inc.).

Example 1

0.4 g of $Nd_2O_3$ sol (average particle diameter of 20 nm; 10% by weight aqueous solution) was weighed, in oxide equivalent, and then diluted with pure water to 8 g in total. 9.55 g of γ-$Al_2O_3$ (average particle diameter of 35 μm; BET specific surface area of 150 $m^2$/g; average pore size of 15 nm) was weighed, which was immersed in a solution containing the above Nd sol for supporting, and then calcined in an electric furnace at 500° C. for 1 hour. Still more, 0.05 g/L of Rh nitrate solution was weighed, in metal equivalent, and diluted with pure water to 8 g in total, which was then immersed to 9.95 g of the above powder for supporting, and calcined in an electric furnace at 500° C. for 1 hour to prepare 0.5% by weight of Rh-4% by weight of $Nd_2O_3$/$Al_2O_3$ of Example 1. Catalyst composition is shown in Table 1. Particle diameter of Rh after catalyst preparation was tried to measure using the TEM but could not be detected, and is assumed that the average particle diameter is 5 nm, which is the lower limit of detection, or smaller.

Figure 1:
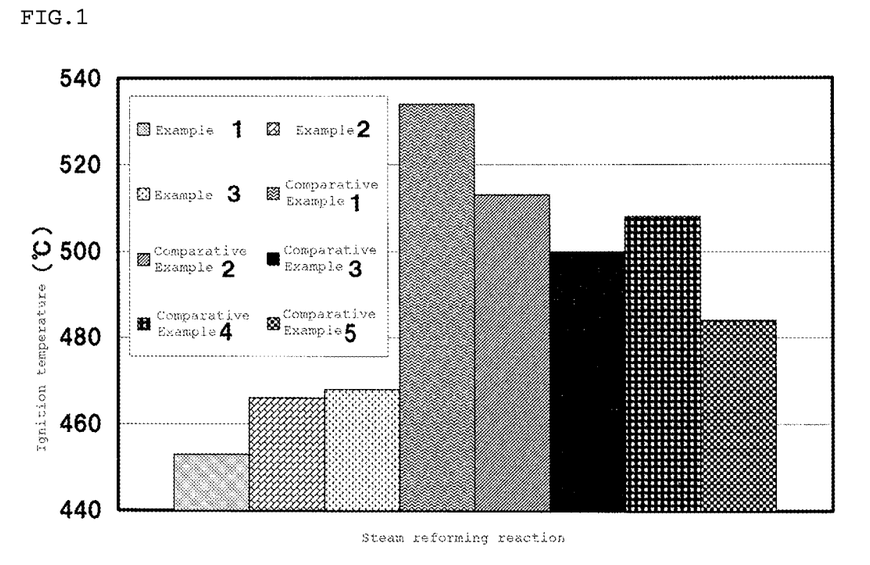
FIG. 1 is an evaluation result of a steam reforming reaction by the catalyst composition for exhaust gas purification, and is a graph showing catalyst bed temperature when conversion rate of $HC(C_3H_6)$ reached 20%.

Next, the resulting catalyst powder was calcined in an electric furnace at 1,000° C. for 12 hours to prepare a sample for evaluation. From each sample already calcined using the above apparatus, 100 mg was weighed to be put into a sample tube. The sample was evaluated by an SR (Steam Reforming) reaction. As reaction gas condition, 300 mL/min, in total, of gas composed of 1,250 ppm of $C_3H_6$, 5,000 ppm of $H_2O$, and He as balance, was used, whose temperature was raised from room temperature up to 600° C. in a rate of 30° C./min, to measure HC consumed and $H_2$ gas generated in the SR reaction. Catalyst composition is shown in Table 1, as well as average particle diameter of neodymium oxide is shown in Table 2. Measurement result of catalyst activity of the SR reaction is shown in FIG. 1.

Example 2

0.5% by weight of Rh-4% by weight of $Nd_2O_3$/$Al_2O_3$ of Example 2 was prepared by a similar preparation method as in Example 1, except by changing the $Nd_2O_3$ sol to a 10% by weight aqueous solution of the one having an average particle diameter of 40 nm. Particle diameter of Rh after catalyst preparation was tried to measure using the TEM but could not be detected, and is assumed that the average particle diameter is 5 nm, which is the lower limit of detection, or smaller.

After that, using the catalyst powder obtained, HC consumed and $H_2$ gas generated in the SR reaction were measured. Catalyst composition is shown in Table 1, as well as average particle diameter of neodymium oxide is shown in Table 2. Measurement result of catalyst activity of the SR reaction is shown in FIG. 1.

Example 3

0.5% by weight of Rh-4% by weight of $Nd_2O_3$/$Al_2O_3$ of Example 3 was prepared by a similar preparation method as in Example 1, except by using Nd nitrate (0.4 g in oxide equivalent), instead of the $Nd_2O_3$ sol. Particle diameter of Rh and particle diameter of $Nd_2O_3$ after catalyst preparation was tried to measure using the TEN but both of the particle diameter of Rh and particle diameter of $Nd_2O_3$ could not be detected, and both are assumed to be 5 nm, which is the lower limit of detection, or smaller.

After that, using the catalyst powder obtained, HC consumed and $H_2$ gas generated in the SR reaction were measured. Catalyst composition is shown in Table 1, as well as average particle diameter of neodymium oxide is shown in Table 2. Measurement result of catalyst activity of the SR reaction is shown in FIG. 1.

Comparative Example 1

Similarly as in Example 1, except that the $Nd_2O_3$ sol was not used, 0.05 g of Rh nitrate solution was weighed, in metal equivalent, and then diluted with pure water to 8 g in total, and then, which was immersed to γ-$Al_2O_3$ (BET specific surface area of 150 $m^2$/g; average pore size of 15 nm) weighed to 9.55 g, for supporting, and then calcined in an electric furnace at 500° C. for 1 hour, to prepare 0.5% by weight of Rh/$Al_2O_3$ of Comparative Example 1. Particle diameter of Rh after catalyst preparation was tried to measure using the TEM but could not be detected, and is assumed that the average particle diameter is 5 nm, which is the lower limit of detection, or smaller.

After that, using the catalyst powder obtained, HC consumed and $H_2$ gas generated in the SR reaction were measured. Catalyst composition is shown in Table 1, as well as average particle diameter of neodymium oxide is shown in Table 2. Measurement result of catalyst activity of the SR reaction is shown in FIG. 1.

Comparative Example 2

0.5% by weight of Rh-4% by weight of $SiO_2$/$Al_2O_3$ of Comparative Example 2 was prepared by a similar preparation method as in Example 1, except by using $SiO_2$ sol (average particle diameter of 20 nm; 10% by weight aqueous solution), instead of the $Nd_2O_3$ sol. Particle diameter of Rh after catalyst preparation was tried to measure using the TEM but could not be detected, and is assumed that the average particle diameter is 5 nm, which is the lower limit of detection, or smaller.

After that, using the catalyst powder obtained, HC consumed and $H_2$ gas generated in the SR reaction were measured. Catalyst composition is shown in Table 1, as well as average particle diameter of neodymium oxide is shown in Table 2. Measurement result of catalyst activity of the SR reaction is shown in FIG. 1.

Comparative Example 3

0.5% by weight of Rh-4% by weight of $ZrO_2/Al_2O_3$ of Comparative Example 3 was prepared by a similar preparation method as in Example 1, except by using $ZrO_2$ sol (average particle diameter of 20 nm; 10% by weight aqueous solution), instead of the $Nd_2O_3$ sol. Particle diameter of Rh after catalyst preparation was tried to measure using the TEM but could not be detected, and is assumed that the average particle diameter is 5 nm, which is the lower limit of detection, or smaller.

After that, using the catalyst powder obtained, HC consumed and $H_2$ gas generated in the SR reaction were measured. Catalyst composition is shown in Table 1, as well as average particle diameter of neodymium oxide is shown in Table 2. Measurement result of catalyst activity of the SR reaction is shown in FIG. 1.

Comparative Example 4

0.5% by weight of Rh-4% by weight of $TiO_2/Al_2O_3$ of Comparative Example 4 was prepared by a similar preparation method as in Example 1, except by using $TiO_2$ sol (average particle diameter of 20 nm; 10% by weight aqueous solution), instead of the $Nd_2O_3$ sol. Particle diameter of Rh after catalyst preparation was tried to measure using the TEM but could not be detected, and is assumed that the average particle diameter is 5 nm, which is the lower limit of detection, or smaller.

After that, using the catalyst powder obtained, HC consumed and $H_2$ gas generated in the SR reaction were measured. Catalyst composition is shown in Table 1, as well as average particle diameter of neodymium oxide is shown in Table 2. Measurement result of catalyst activity of the SR reaction is shown in FIG. 1.

Comparative Example 5

0.5% by weight of Rh-4% by weight of $CeO_2/Al_2O_3$ of Comparative Example 5 was prepared by a similar preparation method as in Example 1, except by using $CeO_2$ sol (average particle diameter of 20 nm; 10% by weight aqueous solution), instead of the $Nd_2O_3$ sol. Particle diameter of Rh after catalyst preparation was tried to measure using the TEM but could not be detected, and is assumed that the average particle diameter is 5 nm, which is the lower limit of detection, or smaller.

After that, using the catalyst powder obtained, HC consumed and $H_2$ gas generated in the SR reaction were measured. Catalyst composition is shown in Table 1, as well as average particle diameter of neodymium oxide is shown in Table 2. Measurement result of catalyst activity of the SR reaction is shown in FIG. 1.

TABLE 1

|  | Noble metal Rh (g) | Additives | | Base material $Al_2O_3$ (g) | Total weight (g) |
|---|---|---|---|---|---|
|  |  | Raw material | Metal oxide equivalent (g) |  |  |
| Example 1 | 0.05 | Neodymium oxide sol | 0.4 | 9.55 | 10 |
| Example 2 |  | Neodymium oxide sol |  |  |  |
| Example 3 |  | Neodymium nitrate |  |  |  |
| Comparative Example 1 |  | — | — | 9.55 |  |
| Comparative Example 2 |  | Silica sol | 0.4 | 9.55 |  |
| Comparative Example 3 |  | Zirconia sol |  |  |  |
| Comparative Example 4 |  | Titania sol |  |  |  |
| Comparative Example 5 |  | Ceria sol |  |  |  |

TABLE 2

|  | Additives | |
|---|---|---|
|  | Raw material | Particle diameter (nm) |
| Example 1 | Neodymium oxide sol | 20* |
| Example 2 | Neodymium oxide sol | 40* |
| Example 3 | Neodymium nitrate | ≤5** |
| Comparative Example 1 | — | — |
| Comparative Example 2 | Silica sol | 20* |
| Comparative Example 3 | Zirconia sol | 20* |
| Comparative Example 4 | Titania sol | 20* |
| Comparative Example 5 | Ceria sol | 20* |

(Note)
*Average particle diameter, in the case where a raw material is sol, is based on catalogue value.
**In the case of neodymium nitrate, powder after preparation was measured using a TEM, but the neodymium oxide could not be detected (lower detection limit value: 5 nm).

[Evaluation Result]

From FIG. 1 showing result of T20 temperature in the above SR reaction evaluation, the following can be understood. T20 temperature is temperature when HC purification ratio becomes 20%, and becomes an index of low temperature activity. The lower T20 temperature shows quick initiation of the reaction from the lower temperature, and is evaluated to have high catalytic activity.

It has been confirmed that T20 of Comparative Example 1 not added with the additives was 534° C., while in Examples 1 and 2 where the neodymium oxide sol, having an average particle diameter of 20 to 40 nm, was added, as the raw material, the SR reaction proceeded from as lower temperature as by 80 to 70° C.

In addition, it has been confirmed that also in the case where neodymium nitrate was used as a raw material (average particle diameter after catalyst preparation was 5 nm or smaller), the SR reaction proceeded from lower temperature by 70° C. or less. On the other hand, in Comparative Examples 2 to 5, where sol except for the neodymium oxide sol (silica, zirconia, titania, ceria) was added, although the SR reaction proceeded from lower temperature, as compared with Comparative Example 1 having no additives, it was never superior over Examples 1 to 3, using the neodymium oxide sol or neodymium nitrate as the raw material.

In this way, any of the catalysts of the present invention using neodymium oxide exerted superior characteristics in the steam reforming reaction.

Example 4

Firstly, a Pd-supported ceriazirconia composite oxide of a catalyst composition was prepared by the following procedure, and subsequently, a catalyst layer was formed on a honeycomb carrier, together with γ-alumina and barium sulfate.

[Pd/Ceriazirconia Composite Oxide]

27 g of Pd nitrate solution was weighed, in metal equivalent, and diluted with pure water to 650 g in total. 650 g of ceria-zirconia composite oxide (ceria: 45% by weight, zirconia: 55% by weight, BET specific surface area of 65 m$^2$/g, average pore size of 12 nm) was weighed, which was immersed in the above Pd nitrate solution for supporting, and then calcined in an electric furnace at 500° C. for 1 hour, to prepare 4% by weight Pd/ceriazirconia composite oxide.

[Preparation of Pd Layer (Lower Layer)]

Each of 677 g of 4% by weight Pd/ceriazirconia composite oxide, 400 g of γ-alumina (BET specific surface area of 150 m$^2$/g, average pore size of 15 nm), and 150 g of barium sulfate (BET specific surface area of 5 m$^2$/g, average particle diameter of 1.0 μm) was weighed, which was then charged in a pot mill, and added with 1.5 L of pure water and alumina sol (10 g) as a binder, for milling. Slurry prepared in this way was coated, by a washcoat method, on a cordierite carrier of 0.8 L, 600 cells/inch$^2$ (93 cells/cm$^2$) and 4 mil (0.1 mm), to attain weight of 123.7 g/L after calcining, and after drying at 150° C., it was calcined at 500° C. for 1 hour, to prepare a Pd supported layer as the lower layer {Pd (2.7 g/L)/ceriazirconia composite oxide (40 g/L)+Al$_2$O$_3$ (65 g/L)+BaSO$_4$ (15 g/L)+binder Al$_2$O$_3$ (1 g/L)}

[Rh—Nd$_2$O$_3$/Al$_2$O$_3$]

40 g of Nd$_2$O$_3$ sol (average particle diameter of 20 nm; 10% by weight aqueous solution) was weighed, in oxide equivalent, and then diluted with pure water to 620 g in total. 780 g of γ-Al$_2$O$_3$ (BET specific surface area of 150 m$^2$/g; average pore size of 15 nm) was weighed, which was immersed in a solution containing the above Nd sol for supporting, and then calcined in an electric furnace at 500° C. for 1 hour. Still more, 2.5 g/L of Rh nitrate solution was weighed, in metal equivalent, and diluted with pure water to 620 g in total, which was then immersed to 820 g of the above powder for supporting, and calcined in an electric furnace at 500° C. for 1 hour to prepare 0.3% by weight of Rh-4.9% by weight of Nd$_2$O$_3$/Al$_2$O$_3$.

[Preparation of Rh Layer (Upper Layer)]

Each of 822.5 g of 0.3% by weight of Rh 4.9% by weight of Nd$_2$O$_3$/Al$_2$O$_3$ and 100 g of a ceria-zirconia composite oxide (cerin: 45% by weight, zirconia: 55% by weight), was weighed, which was then charged in a pot mill, and added with 1.1 L of pure water and alumina sol (20 g) as a binder, for milling. Slurry prepared in this way was coated, by a washcoat method, on the above catalyst supporting Pd, so as to attain 84.25 g/L coating after calcining, and after drying at 150° C., it was calcined at 500° C. for 1 hour, to prepare a Pd supported layer as the upper layer {Rh (0.25 g/L)–Nd$_2$O$_3$ (4 g/L)/Al$_2$O$_3$ (78 g/L)+ceriazirconia composite oxide (10 g/L)+binder Al$_2$O$_3$ (2 g/L)}. A Rh/Pd supporting catalyst was prepared.

By the above production method, a Pd—Rh catalyst {lower layer: Pd (2.7 g/L)/ceriazirconia composite oxide (40 g/L)+Al$_2$O$_3$ (65 g/L)+BaSO$_4$ (15 g/L)+binder Al$_2$O$_3$ (1 g/L), and upper layer: Rh (0.25 g/L)–Nd$_2$O$_3$ (4 g/L)/Al$_2$O$_3$ (78 g/L) ceria-zirconia composite oxide (10 g/L)+binder Al$_2$O$_3$ (2 g/L)} of Example 4 was prepared. Composition of the catalyst obtained is summarized in Table 3.

After that, the catalyst obtained was subjected to engine aging by the above method, and then a driving test in a JC08 mode on a chassis stand, by loading the converter with the catalyst after engine aging, at the exhaust gas exit of a vehicle loaded with the 1.3 L-engine. Discharge amount of HC and NO$_x$ was measured in a cold region and a total driving mode, and the result is summarized in FIG. 2.

Figure 3:
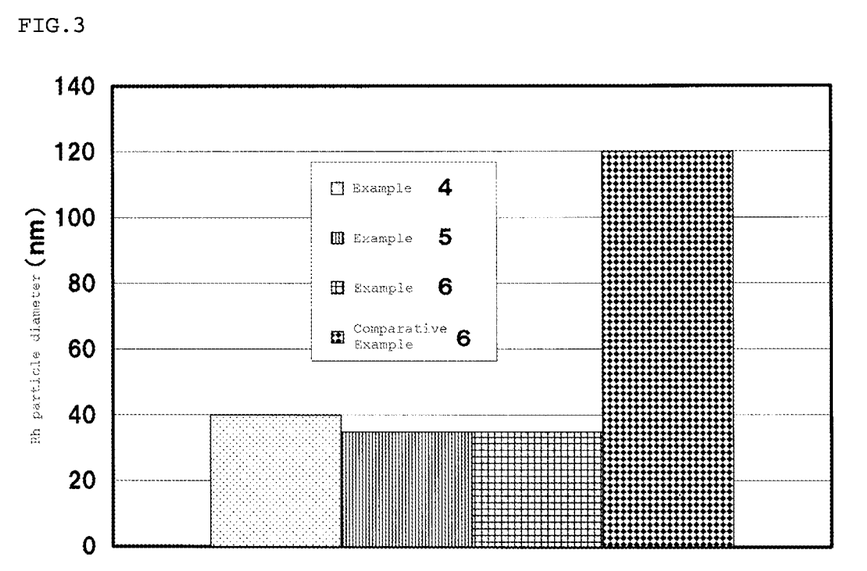
FIG. 3 is a graph showing measurement result of Rh particle diameter, after aging of the catalyst for exhaust gas purification for automobile.
Figure 4:
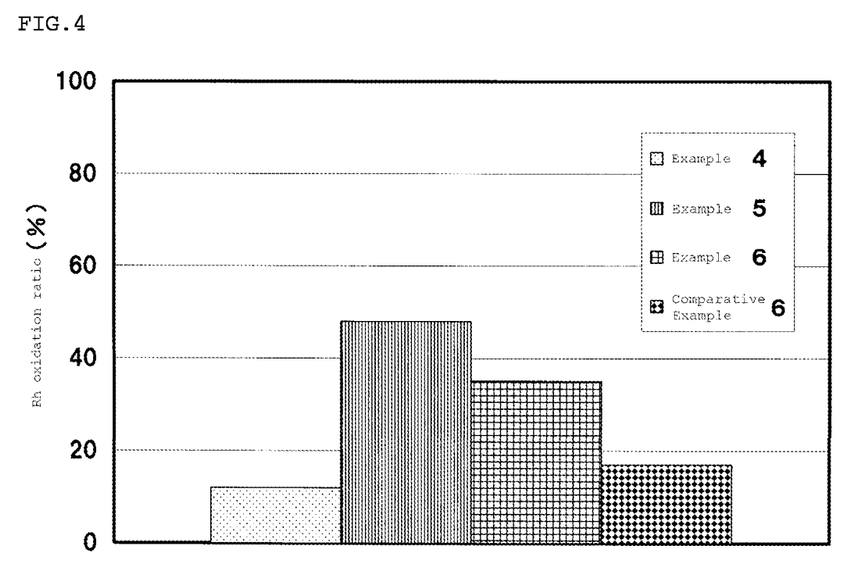
FIG. 4 is a graph showing oxidation degree of Rh, after aging of the catalyst for exhaust gas purification for automobile.

In addition, a part of the catalyst, after the driving test in the JC08 mode, was cut out to measure particle diameter of Rh and an oxidation state of Rh by the above method, and each result thereof is shown in FIG. 3 and FIG. 4, respectively.

Example 5

Similarly as in Example 4, except by weighing 100 g of Nd$_2$O$_3$ sol (average particle diameter of 20 nm; 10% by weight aqueous solution), in oxide equivalent, Pd—Rh catalyst of Example 5 {lower layer: Pd (2.7 g/L)/ceriazirconia composite oxide (40 g/L)+Al$_2$O$_3$ (65 g/L) BaSO$_4$ (15 g/L)+binder Al$_2$O$_3$ (1 g/L), upper layer: Rh (0.25 g/L)–Nd$_2$O$_3$ (10 g/L)/Al$_2$O$_3$ (78 g/L)+ceriazirconia composite oxide (10 g/L)+binder Al$_2$O$_3$ (2 g/L)} was prepared. Composition of the catalyst obtained is summarized in Table 3.

The catalyst obtained was subjected to engine aging similarly as in Example 4, and then a driving test in a JC08 mode on a chassis stand, by loading the converter with the catalyst after engine aging, at the exhaust gas exit of a vehicle loaded with the 1.3 L-engine. The result is summarized in FIG. 2.

In addition, a part of the catalyst (same size from same place as in Example 4), after the driving test in the JC08 mode, was cut out to measure particle diameter of Rh and an oxidation state of Rh by the above method, and each result thereof is shown in FIG. 3 and FIG. 4, respectively.

Still more, result of a TEN photo showing positional relation of the Rh particle and the Nd particle after engine aging is shown in FIG. 5.

Example 6

Similarly as in Example 4, except by weighing 40 g of Nd nitrate, in oxide equivalent, instead of Nd$_2$O$_3$ sol, Pd—Rh catalyst of Example 6 {lower layer: Pd (2.7 g/L)/ceriazirconia composite oxide (40 g/L)+Al$_2$O$_3$ (65 g/L)+BaSO$_4$ (15 g/L)+binder Al$_2$O$_3$ (1 g/L), upper layer: Rh (0.25 g/L)–Nd$_2$O$_3$ (4 g/L)/Al$_2$O$_3$ (78 g/L) ceriazirconia composite oxide (10 g/L)+binder Al$_2$O$_3$ (2 g/L)} was prepared. Composition of the catalyst obtained is summarized in Table 3.

The catalyst obtained was subjected to engine aging similarly as in Example 4, and then a driving test in a JC08 mode on a chassis stand, by loading the converter with the catalyst after engine aging, at the exhaust gas exit of a vehicle loaded with the 1.3 L-engine. The result is summarized in FIG. 2.

In addition, a part of the catalyst (the same size from the same place as in Example 4), after the driving test in the JC08 mode, was cut out to measure particle diameter of Rh and an oxidation state of Rh by the above method, and each result thereof is shown in FIG. 3 and FIG. 4, respectively.

Comparative Example 6

Similarly as in Example 4, except by not using $Nd_2O_3$ sol, Pd—Rh catalyst of Comparative Example 6 {lower layer: Pd (2.7 g/L)/ceriazirconia composite oxide (40 g/L)+$Al_2O_3$ (65 g/L) $BaSO_4$ (15 g/L)+binder $Al_2O_3$ (1 g/L), upper layer: Rh (0.25 g/L)/$Al_2O_3$ (78 g/L) ceriazirconia composite oxide (10 g/L) binder $Al_2O_3$ (2 g/L)} was prepared. Composition of the catalyst obtained is summarized in Table 3.

The catalyst obtained was subjected to engine aging similarly as in Example 4, and then a driving test in a JC08 mode on a chassis stand, by loading the converter with the catalyst after engine aging, at the exhaust gas exit of a vehicle loaded with the 1.3 L-engine. The result is summarized in FIG. 2.

In addition, a part of the catalyst (same size from same place as in Example 4), after the driving test in the JC08 mode, was cut out to measure particle diameter of Rh and an oxidation state of Rh by the above method, and each result thereof is shown in FIG. 3 and FIG. 4, respectively.

Still more, result of a TEE photo relating to the Rh particle after engine aging is shown in FIG. 6.

120 nm, as is clear from FIG. 3, as well as oxidation ratio of Rh was 17%, showing most of Rh was in a metallic state, as is clear from FIG. 4.

On the other hand, in Examples 4 to 6, where neodymium oxide was added, as is clear from FIG. 3, it has been understood that the Rh particle exists maintaining as small size as an average particle diameter of 35 to 40 nm, even after engine aging. In addition, as is clear from FIG. 4, it has been understood that oxidation rate of Rh is inhibited to 50% or lower, such as 22 to 48%. In particular, in Example 4, oxidation ratio of Rh was 22%, nearly the same level as in Comparative Example 6, where neodymium oxide is not present.

It is understood that these differences are derived from presence of neodymium oxide, and as compared with Comparative Example 6, where neodymium oxide was not added, and large particles of Rh are present in an isolated state, as is clear from FIG. 6, in Example 4 where neodymium oxide is added, Rh exists as a small particle as it is, and the neodymium oxide particle with a nearly similar size exists at the neighborhood of the Rh particle.

In this way, any of the catalysts of the present invention using neodymium oxide, superior in a steam reforming reaction, exerted superior characteristics in a purification reaction of all of CO, HC and NOx, as a three-way catalyst.

INDUSTRIAL APPLICABILITY

The catalyst for exhaust gas purification for automobile of the present invention is superior in purification performance of carbon monoxide (CO), hydrocarbons (HC) and nitrogen oxides ($NO_x$) in exhaust gas discharged from an internal combustion engine such as a gasoline vehicle or the like.

TABLE 3

| Stratification | Classification | Detail | Example 4 | Example 5 | Example 6 | Comparative Example 6 |
|---|---|---|---|---|---|---|
| Upper layer | Noble metal | Rh (g/L) | | | 0.25 | |
| | Additives | $Nd_2O_3$ (g/L) | 4* | 10* | 4* | — |
| | Base material | $Al_2O_3$ (g/L) | | | 78 | |
| | Promoter | Ce—Zr composite oxide (g/L) | | | 10 | |
| | Binder | $Al_2O_3$ (g/L) | | | 2 | |
| Lower layer | Noble metal | Pd (g/L) | | | 2.7 | |
| | Base material | Ce—Zr composite oxide (g/L) | | | 40 | |
| | Promoter | $Al_2O_2$ (g/L) | | | 65 | |
| | | $BaSO_4$ (g/L) | | | 15 | |
| | Binder | $Al_2O_3$ (g/L) | | | 1 | |

(Note)
*$Nd_2O_3$ sol
**Nd nitrate

[Evaluation Result]

Figure 2:
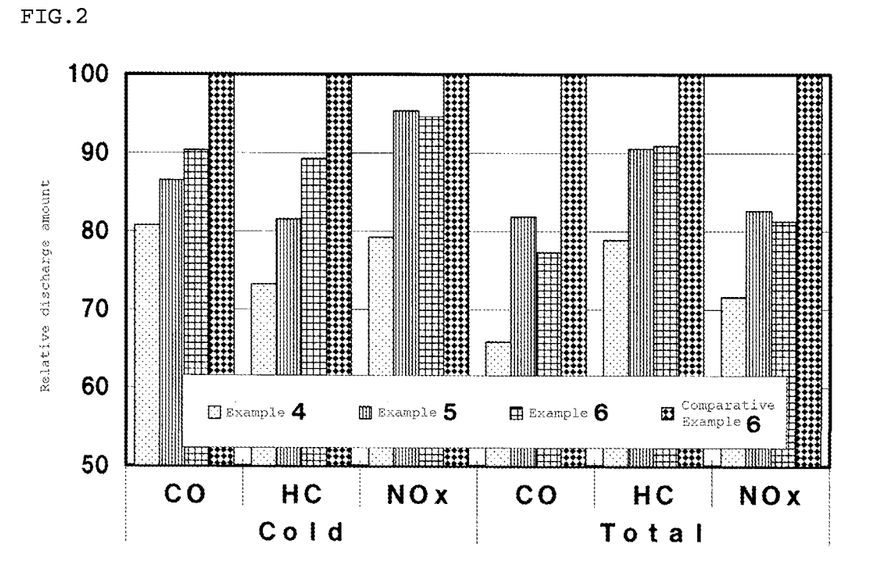
FIG. 2 is evaluation result in chassis running by the catalyst for exhaust gas purification for automobile, and is a graph showing relatively discharge amount of CO, HC and $NO_x$, in a Cold and in Total.

The following has been understood from FIG. 2, where result of driving in the JC08C mode by the above catalyst was summarized, and FIGS. 3 and 4 where particle diameter of Rh and an oxidation state of Rh were measured.

Firstly, as is clear from FIG. 2, in Examples 4 to 6, where neodymium oxide was added as an additive, as compared with Comparative Example 6 without the additive, discharge amount of all of CO, HC and $NO_x$ in the cold region decreased, and thus exhaust gas purification at low temperature was improved. Similarly, it has been confirmed that exhaust gas purification performance in mode total was also improved, similarly as in the cold region. In particular, condition shown in Example 4 was best. On the contrary, average particle diameter of Rh in Comparative Example 6, where neodymium oxide was not added, was relatively as large as However, the present invention is not limited to automobile applications, and is widely applicable also to denitration technology of nitrogen oxides in exhaust gas.

The invention claimed is:

1. An exhaust gas purification catalyst composition for purifying a carbon monoxide (CO), a hydrocarbon (HC) and nitrogen oxides ($NO_x$) in exhaust gas, comprising:
   a rhodium (Rh) particle (A);
   a neodymium oxide ($Nd_2O_3$) particle (B); and
   alumina (C) support supporting the rhodium particle (A) and the neodymium oxide ($Nd_2O_3$) particle (B),
   wherein the neodymium oxide particle (B) having an average particle diameter of 100 nm or smaller, exists at the neighborhood of the rhodium particle (A), as a transfer inhibiting material.

2. The exhaust gas purification catalyst composition according to claim 1, wherein supported amount of neodymium oxide is 1 to 20% by weight.

3. The exhaust gas purification catalyst composition according to claim 2, wherein the alumina support is coated onto a carrier, as a catalyst layer.

4. The exhaust gas purification catalyst composition according to claim 3, wherein the catalyst composition is coated with another catalyst layer comprising a noble metal different from rhodium, in addition to the catalyst layer.

5. The exhaust gas purification catalyst composition according to claim 4, wherein the noble metal different from rhodium is platinum and/or palladium.

6. The exhaust gas purification catalyst composition according to claim 3, wherein total coated amount of the catalyst composition is 50 to 300 g/L per unit volume of the carrier.

7. The exhaust gas purification catalyst composition according to claim 3, wherein an average particle diameter of the rhodium particle (A) is 100 nm or smaller.

8. The exhaust gas purification catalyst composition according to claim 3, wherein the catalyst layer further contains a ceria-zirconia composite oxide.

9. The exhaust gas purification catalyst composition according to claim 2, wherein an average particle diameter of the rhodium particle (A) is 100 nm or smaller.

10. The exhaust gas purification catalyst composition according to claim 1, wherein the alumina support is coated onto a carrier, as a catalyst layer.

11. The exhaust gas purification catalyst composition according to claim 10, wherein the catalyst layer further contains a ceria-zirconia composite oxide.

12. The exhaust gas purification catalyst composition according to claim 11, wherein the catalyst composition is coated with a catalyst layer comprising a noble metal different from rhodium, in addition to the catalyst layer.

13. The exhaust gas purification catalyst composition according to claim 10, wherein the catalyst composition is coated with a catalyst layer comprising a noble metal different from rhodium, in addition to the catalyst layer.

14. The exhaust gas purification catalyst composition according to claim 13, wherein the noble metal different from rhodium is platinum and/or palladium.

15. The exhaust gas purification catalyst composition according to claim 10, wherein total coated amount of the catalyst composition is 50 to 300 g/L per unit volume of the carrier.

16. The exhaust gas purification catalyst composition according to claim 10, wherein an average particle diameter of the rhodium particle (A) is 100 nm or smaller.

17. The exhaust gas purification catalyst composition according to claim 1, wherein an average particle diameter of the rhodium particle (A) is 100 nm or smaller.

\* \* \* \* \*